(12) United States Patent
Isaman et al.

(10) Patent No.: US 6,962,209 B2
(45) Date of Patent: Nov. 8, 2005

(54) SIMPLE, DURABLE AND EASY-TO-USE EARTHWORKING MACHINE

(75) Inventors: Thomas E. Isaman, Ham Lake, MN (US); Terrence R. Bondeson, Woodbury, MN (US); Andrew Hawkins, Hopkins, MN (US)

(73) Assignee: Turfco Manufacturing Inc., Minneapolis, MN (US)

( * ) Notice: Subject to any disclaimer, the term of this patent is extended or adjusted under 35 U.S.C. 154(b) by 157 days.

(21) Appl. No.: 09/982,126

(22) Filed: Oct. 17, 2001

(65) Prior Publication Data

US 2003/0037934 A1 Feb. 27, 2003

(51) Int. Cl.$^7$ .......................... A01B 45/04; F16C 3/00; F16B 7/10; B62K 21/16; B62D 51/04
(52) U.S. Cl. .......................... 172/19; 172/43; 172/118; 74/551.4; 180/19.3; 180/385; 296/203.01; 296/205; 403/109.6; 464/182
(58) Field of Search .............................. 172/17, 19, 20, 172/41–43, 118–123; 464/182; 180/19.1, 19.3, 385; 296/203, 203.01–209.04; 403/109.6; 74/551.1, 551.3–551.7, 551.2; D12/178

(56) References Cited

U.S. PATENT DOCUMENTS

| | | |
|---|---|---|
| 471,231 A | 3/1892 | Bentley |
| 743,277 A | 11/1903 | Harlan |
| 776,844 A | 12/1904 | Hudlemeyer et al. |
| 831,346 A | 9/1906 | Hoover |
| 2,051,977 A | 8/1936 | Winston et al. |
| 2,533,542 A | 12/1950 | Walz et al. |
| 2,617,347 A | 11/1952 | Provost |
| 2,631,513 A | 3/1953 | Silver et al. |
| 2,682,824 A | 7/1954 | Bowser et al. |
| 2,702,502 A | 2/1955 | Rogneby |
| 2,905,253 A | 9/1959 | Ditter |
| 3,201,944 A | 8/1965 | Christensen |
| 3,357,499 A | 12/1967 | Finneyfrock .................. 61/72.5 |

(Continued)

FOREIGN PATENT DOCUMENTS

| | | | |
|---|---|---|---|
| DE | 100 27 539 A 1 | * | 12/2001 |
| GB | 620651 | | 3/1949 |

OTHER PUBLICATIONS

The Maxi–Roll High Volume Sode Harvester Teledyne–Princeton, Canal Winchester, Ohio 43110, date unknown.
Borderline Stamp USA, Inc., SC–750G Sod Cutter, date unknown.
Kerb–Line Mini Turf Cutter, photographs and operating instructions and safety notes, date unknown.

*Primary Examiner*—Christopher J. Novosad
(74) *Attorney, Agent, or Firm*—Alan D. Kamrath; Nikolai & Mersereau, P.A.

(57) ABSTRACT

A sod cutter (10) is disclosed including a frame (12) formed by welding the free edges of mount, frame and end plates (46a, 46b 46c) bent relative to one of two side plates (46) to the corresponding edges of the other side plate (48). An axle assembly (160) is pivotal relative to the frame (12) by a depth adjustment lever (198) between a working position where wheels (16) carried by the axle assembly (160) engage tubular members (168) slideably and nonrotatably received on a drive shaft (166) and a transport position where the wheels (16) are spaced from the tubular members (168). A U-shaped handlebar (210) is positionable between an operating position for grasping during operation and a storage position for lifting and handling. A U-shaped control (212) is pivotably mounted in front of and above the U-shaped handlebar (210) for actuating the throttle of the engine (18). A threaded lock (192) provides a connection between the handle mounting tube (180) and the mast (214) of the handlebar (210) and is not threadably removable by a spring pin (196) extending from the lock (192) and received in a gap defined between the mounting tube (180) and a locking plate.

29 Claims, 3 Drawing Sheets

U.S. PATENT DOCUMENTS

| | | | |
|---|---|---|---|
| 3,498,386 A | 3/1970 | Daymon | 172/19 |
| 3,540,535 A | 11/1970 | Brouwer et al. | 172/19 |
| 3,672,452 A | 6/1972 | Miner | 172/19 |
| 3,695,713 A | 10/1972 | Rothi et al. | 299/10 |
| 3,750,215 A * | 8/1973 | Liebscher | 15/42 |
| 3,777,460 A | 12/1973 | Mokros | 56/16.7 |
| 3,807,504 A | 4/1974 | Nunes, Jr. | 172/20 |
| 3,812,918 A | 5/1974 | Beck | 172/19 |
| 3,856,090 A | 12/1974 | Haffner et al. | 172/20 |
| 3,887,013 A | 6/1975 | Helberg | 172/20 |
| 3,913,682 A | 10/1975 | Kaercher, Jr. et al. | 172/20 |
| 3,957,100 A * | 5/1976 | Guidetti | 152/9 |
| 4,049,060 A | 9/1977 | Hoke | 172/19 |
| RE29,993 E * | 5/1979 | Wagner | 74/750 R |
| 4,185,847 A * | 1/1980 | Johnson | 280/87.04 A |
| 4,286,670 A * | 9/1981 | Ackerman | 172/42 |
| 4,300,640 A * | 11/1981 | Baxter et al. | 172/311 |
| 4,310,168 A * | 1/1982 | Macaluso | 280/11.24 |
| 4,330,156 A | 5/1982 | Gurries | 299/37 |
| 4,354,556 A | 10/1982 | Evans | 172/19 |
| 4,377,918 A * | 3/1983 | Zbriger | 46/257 |
| 4,440,495 A * | 4/1984 | Bergstrom et al. | 356/155 |
| 4,453,712 A * | 6/1984 | Lee | 273/86 B |
| 4,516,639 A | 5/1985 | Hammarlund et al. | 172/99 |
| 4,541,652 A * | 9/1985 | Deux et al. | 280/672 |
| 4,616,713 A | 10/1986 | Shattuck | 172/19 |
| 4,639,839 A * | 1/1987 | Miyazawa | 362/64 |
| 4,678,042 A | 7/1987 | Barton et al. | 172/15 |
| 4,811,913 A * | 3/1989 | Fernandez | 242/107.6 |
| 4,871,027 A | 10/1989 | Lindstrom et al. | 172/40 |
| 4,892,152 A | 1/1990 | van Vuuren | 172/20 |
| 4,892,153 A | 1/1990 | Cooling et al. | 172/20 |
| 4,922,694 A * | 5/1990 | Emoto | 56/16.7 |
| 4,934,464 A | 6/1990 | Shields | 172/19 |
| 4,946,427 A * | 8/1990 | Rampe | 474/161 |
| 4,958,955 A * | 9/1990 | Laditka | 404/75 |
| 4,966,239 A | 10/1990 | Hutchison | 172/20 |
| 4,982,800 A | 1/1991 | Shields | 172/19 |
| 5,009,270 A | 4/1991 | Vangsgard | 172/42 |
| 5,032,348 A * | 7/1991 | Blum et al. | 376/272 |
| 5,156,217 A * | 10/1992 | Hirata et al. | 172/15 |
| 5,188,389 A * | 2/1993 | Baechler et al. | 280/650 |
| 5,212,896 A * | 5/1993 | Hillard et al. | 37/86 |
| 5,336,146 A * | 8/1994 | Piaget et al. | 482/54 |
| 5,454,433 A | 10/1995 | Worrel et al. | 172/20 |
| 5,571,252 A | 11/1996 | Worrel et al. | 172/20 |
| 5,690,178 A | 11/1997 | Zehrung, Jr. et al. | 172/19 |
| 5,918,683 A * | 7/1999 | Abelsson et al. | 172/15 |
| 6,041,242 A * | 3/2000 | Coulthard | 455/575 |
| 6,084,313 A * | 7/2000 | Frank | 290/40 C |
| 6,135,211 A | 10/2000 | Schroeder | 172/19 |
| 6,258,064 B1 * | 7/2001 | Smith et al. | 604/164.12 |
| 6,457,895 B1 * | 10/2002 | Salman | 403/2 |
| 2002/0106483 A1 * | 8/2002 | Obeshaw | 428/116 |

\* cited by examiner

SIMPLE, DURABLE AND EASY-TO-USE EARTHWORKING MACHINE

BACKGROUND

The present invention relates generally to earthworking machines, particularly to earthworking machines involving an oscillatory blade movement, such as sod cutters, edging machines and pipe laying machines, and specifically to earthworking machines which are simple, durable and easy-to-use.

Sod cutters and other oscillatory blade earthworking machines have been rather widely employed. One example of a sod cutter which has enjoyed commercial success is shown in U.S. Pat. No. 5,009,270. Traditional sod cutters were of complicated design, providing multiple adjustments, and were largely directed to commercial applications because of their costs and difficulty in operation.

Recently, sod cutters of a greatly simplified design have been introduced. Such recent sod cutters are unable to perform many functions of traditional sod cutters such as the ability to adjust the depth of the oscillatory blades, but have shown that traditional sod cutters have not met the requirements of many market niches. However, such recent sod cutters have been unable to satisfy such requirements and needs of the market because of deficiencies inherent in their design.

Thus, a need exists for improved earthworking machines which overcome the deficiencies of recently introduced machines and which have application to not only the market niches exposed by such recently introduced machines but also to traditional machines in their manner of construction and operation.

SUMMARY

The present invention solves this need and other problems in the field of earthworking machines and particularly in the field of earthworking machines involving oscillatory movement by providing, in the preferred form, a frame and its method of manufacture where a frame plate and end plate are bent generally perpendicular to one of two planar side plates and their free edges are welded to the other of the side plates while the openings in side plates are aligned. Thus, the frame is interconnected together in a three dimensional configuration without fasteners and formed from two planar elements.

In other aspects of the present invention, an axle assembly which rotatably mounts at least one wheel is pivotably mounted to the frame between a transport position where the outer periphery of the wheel is spaced from a drive shaft and a working position where the outer periphery of the wheel engages and is frictionally driven by the drive shaft for propelling the earthworking machine.

In most preferred aspects of the present invention, a friction enhancer in the form of a tubular member is removably and slideably received on a shaft in a nonrotatable manner and has noncircular outer periphery cross sections perpendicular to the shaft for engaging the outer periphery of a wheel to drive the wheel when the shaft is rotated.

In still other aspects of the present invention, a threaded lock is threadably received in a first tube which slideably receives a mast or in a lock plate spaced from the first tube and includes a spring pin received in the threaded lock and located in a gap between the tube and the lock plate to prevent the lock from being threaded out of the first tube or lock plate, with the lock being threadable into the first tube and lock plate to extend against the mast.

Further, in aspects of the present invention, the center portion of a U-shaped control of a shape and size corresponding to a U-shaped handlebar is pivotably mounted relative to the U-shaped handlebar about an axis spaced in front of and above the center of the U-shaped handlebar. In an unactuated position, the leg portions of the U-shaped control extend at an acute angle upward relative to the legs of the U-shaped handlebar and is pivotal to engage the legs of the U-shaped handlebar in an actuated position.

Furthermore, in other aspects of the present invention, a handlebar is mounted to a mount in a working position for gripping by an operator and in a storage position where the mast of the handlebar is positioned over the earthworking machine for lifting and hauling. In further aspects, a first linear portion of a mast of a handlebar is slideably connected generally vertically to a handlebar mount such that first and second legs of the U-shaped handlebar extend generally horizontally rearward in a working position and is slideably connected at an acute angle to vertical such that the first and second legs of the U-shaped handlebar extend forward and on opposite sides of the earthworking machine in a storage position.

It is thus an object of the present invention to provide a novel earthworking machine.

It is further an object of the present invention to provide such a novel earthworking machine having very few moving parts and a relatively light weight.

It is further an object of the present invention to provide such a novel earthworking machine which is simple, durable and easy-to-use.

It is further an object of the present invention to provide such a novel earthworking machine utilizing a frame formed by bending and welding planar elements.

It is further an object of the present invention to provide such a novel earthworking machine utilizing a frame interconnected in a three dimensional configuration without fasteners.

It is further an object of the present invention to provide such a novel earthworking machine including a unique friction drive.

It is further an object of the present invention to provide such a novel earthworking machine utilizing a pivotal axle assembly in a friction drive.

It is further an object of the present invention to provide such a novel earthworking machine utilizing a slideable connection where a threaded lock cannot be threaded out of the connection.

It is further an object of the present invention to provide such a novel earthworking machine utilizing a unique control assembly.

It is further an object of the present invention to provide such a novel earthworking machine having a handlebar positionable in a storage position for lifting and hauling and in a working position for gripping during operation.

These and other objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where.

Figure 1:
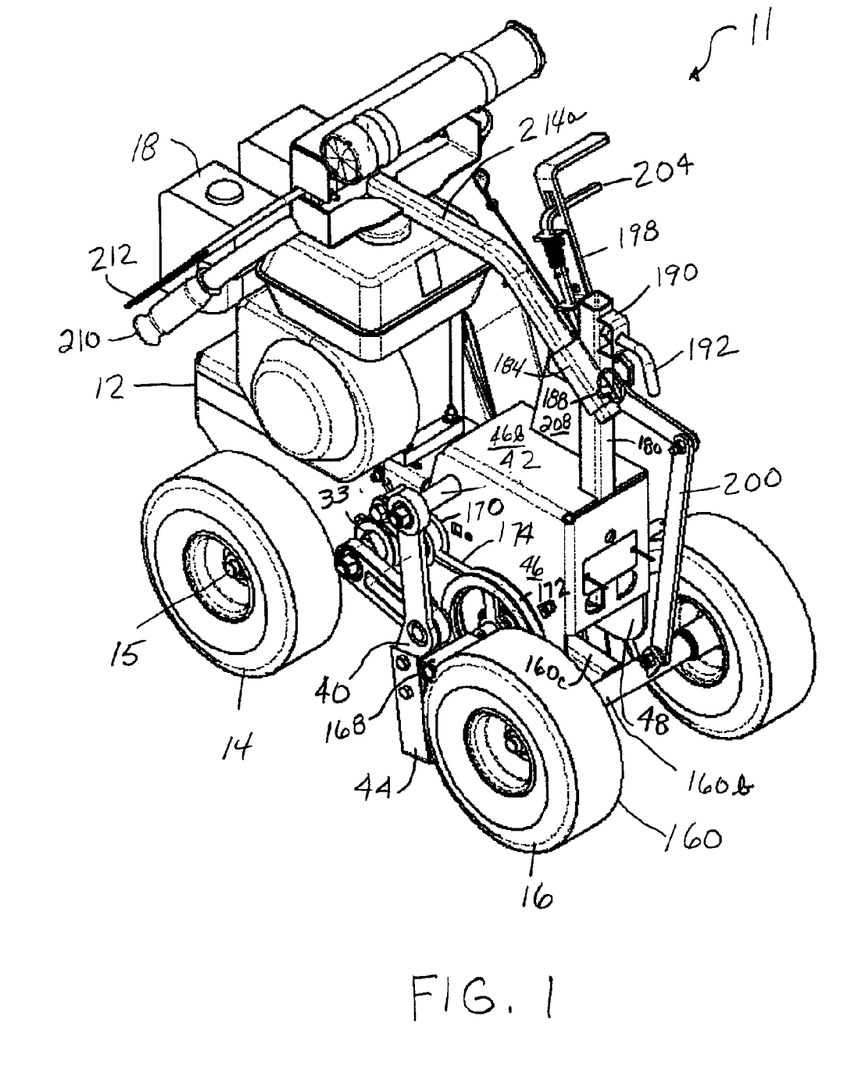
FIG. 1 shows a perspective view of a sod cutter fabricated in accordance with the preferred teachings of the present invention with the handlebar in the storage position.
Figure 2:
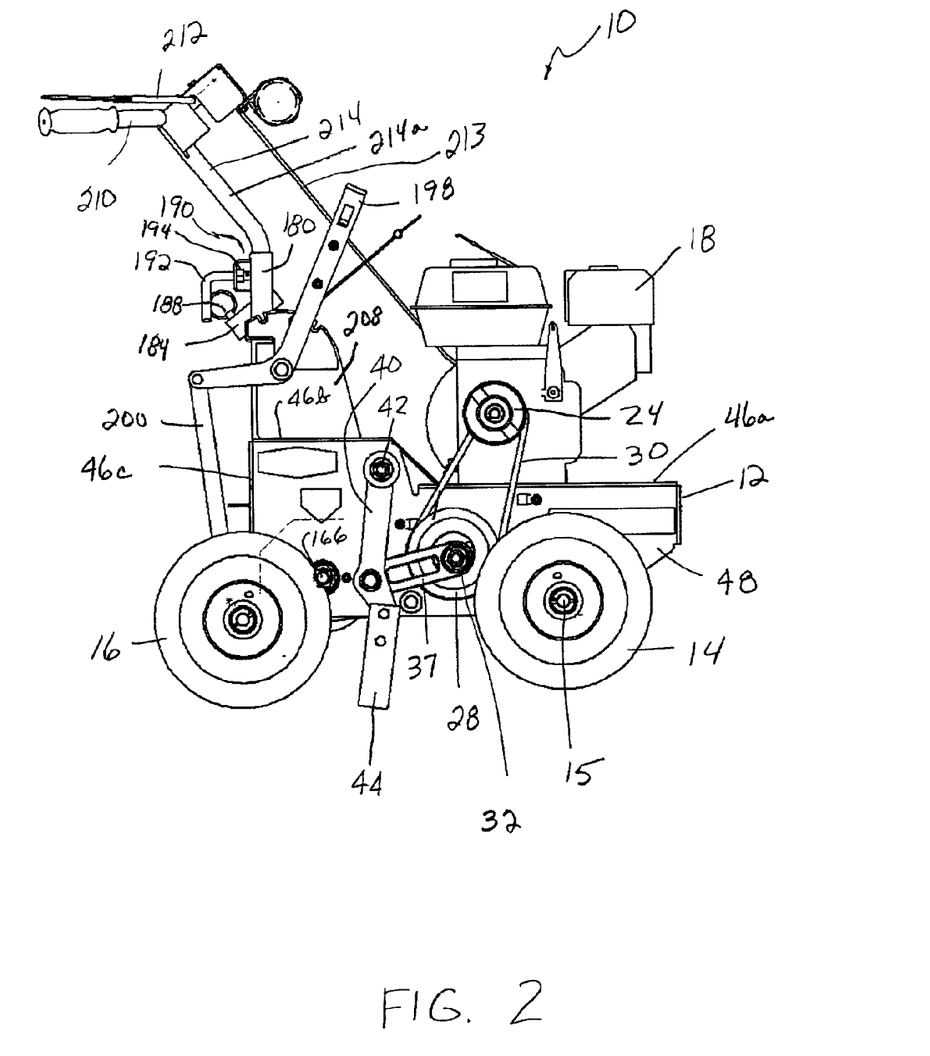
FIG. 2 shows a side plan view of the sod cutter of FIG. 1 with the handlebar in the working position.
Figure 3:
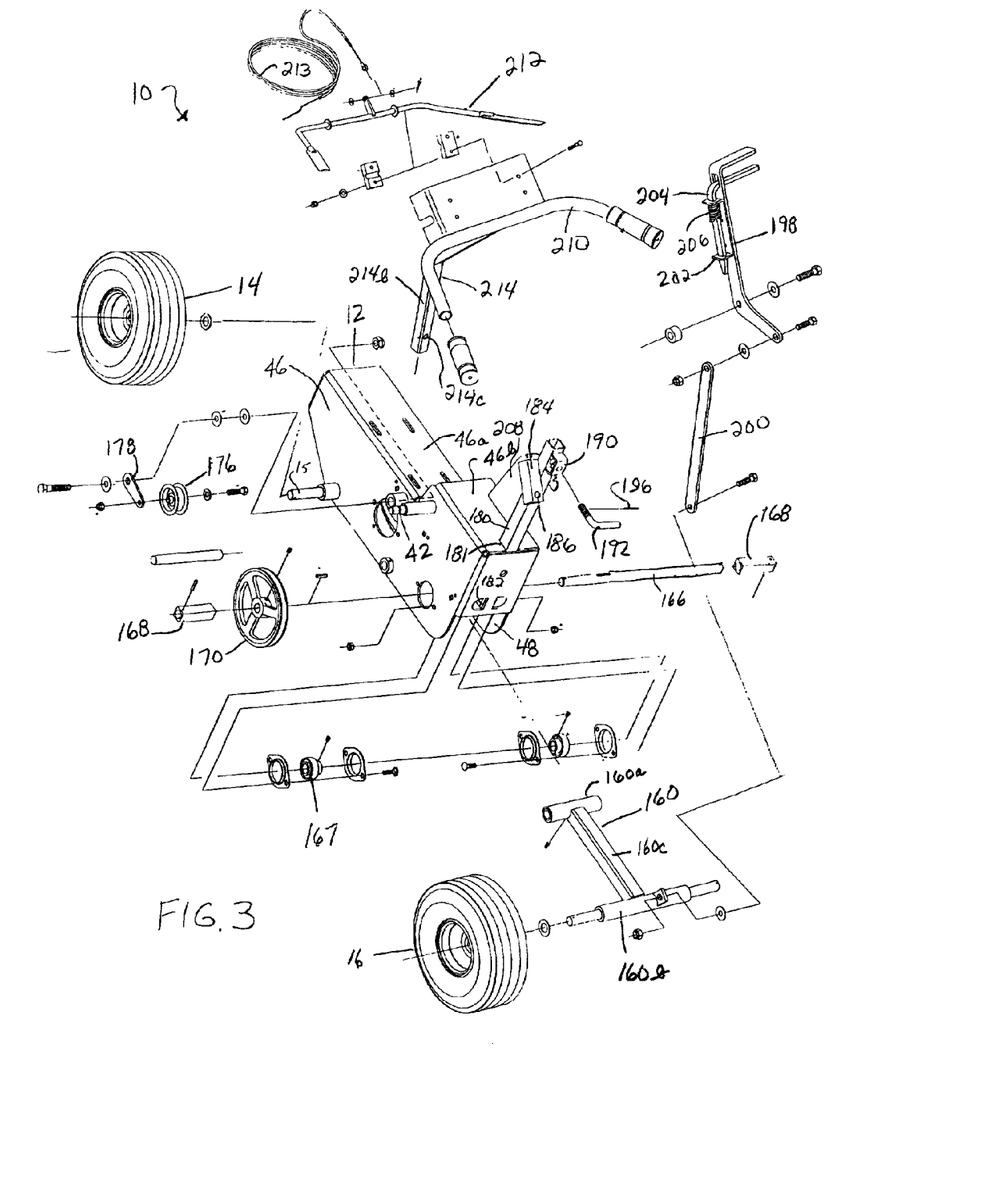
FIG. 3 shows an exploded perspective view of the sod cutter of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "axial", "radial", "first", "second", "side", "end", "inner", "outer", "inside", "outside" "above", "forward", "rearward", "top", "upper", "lower", "horizontal", "vertical", "front", "rear", and similar terms are used herein, it should be understood that these terms have reference only to the structure shown in the drawings as it would appear to a person viewing the drawings and are utilized only to facilitate describing the preferred embodiment.

DETAILED DESCRIPTION OF THE PREFERRED EMBODIMENT

An earthworking machine according to the preferred teachings of the present invention is shown in the drawings and generally designated 10. Generally, machine 10 will be suitable for use with various types of earthworking involving an oscillatory blade movement. Sod cutters, edging machines and pipe laying machines are some examples of earthworking machines for which the present invention will have particular application. In the most preferred embodiment of the present invention, sod cutter 10 is an improvement of the type shown and described in U.S. Pat. No. 5,009,270. For purpose of explanation of the basic teachings of the present invention, the same numerals designate the same or similar parts in the present figures and the figures of U.S. Pat. No. 5,009,270. The description of the common numerals and sod cutter 10 may be found herein and in U.S. Pat. No. 5,009,270, which is hereby incorporated herein by reference.

Referring to the drawings in detail, sod cutter 10 comprises a frame 12 having front wheels 14 and rear wheels 16. However, frame 12 can be suitably moveably supported upon the turf by any suitable means. Mounted on frame 12 is an internal combustion engine 18 providing the propelling and oscillatory power for sod cutter 10. Engine 18 has a centrifugal clutch 24 mounted thereto. A belt 30 is entrained about clutch 24 and a driven pulley 28. Driven pulley 28 is mounted on a rotatable shaft 32 having eccentrically or axially offset portions 33.

A pair of oscillatory side arms 40 are suspended on opposite sides of frame 12 from an upper pivot shaft 42. Whereas arms 40 swing or oscillate about upper shaft 42, arms 40 have attached at their lower ends a U-shaped knife blade 44, with knife blade 44 extending horizontally or laterally between the lower ends of side arms 40. Pitman arms 37 have first ends rotatably mounted upon offset portions 33 and second ends rotatably mounted to arms 40 spaced from upper shaft 42 and knife blade 44.

According to the preferred teachings of the present information, frame 12 is formed by bending and welding planar elements or sheet material into a three dimensional configuration of a generally parallepiped shape. Specifically, frame 12 includes a pair of planar side plates 46 and 48 of a planar configuration and generally of an L-shape. Side plate 46 includes an integral motor mount plate 46a bent generally perpendicular from the front portion of the upper edge of plate 46. An integral frame plate 46b is bent generally perpendicular to the back portion of the upper edge of plate 46 in the same direction as plate 46a. An integral end plate 46c is bent generally perpendicular to the back edge of plate 46 in the same direction as plates 46a and 46b. The upper or top edge of plate 46c is welded to the back or rear edge of plate 46b, with plate 46c extending generally perpendicular to plate 46b. Plate 46a is spaced from plate 46b perpendicular to plates 46a and 46b and spaced from plate 46b perpendicular to plate 46c. Plates 46a, 46b, and 46c have the same extent relative to plate 46. The free edges of plates 46a, 46b, and 46c are welded to respective edges of side plate 48 at generally perpendicular angles, with side plates 46 and 48 being in a generally parallel and spaced relation. Thus, the interconnection of plates 46 and 48 is accomplished without fasteners.

Front wheels 14 are rotatably mounted on opposite sides of frame 12 about an axle shaft 15 extending between front portions of side plates 46 and 48 and spaced from and generally parallel to plate 46a. In the preferred form, shaft 15 is held in place by extending through and being welded to collars in turn welded to side plates 46 and 48.

In the preferred form, sod cutter 10 further includes a pivotable axle assembly 160 of a generally H-shape. Specifically, assembly 160 includes a first leg 160a which is pivotably mounted to the rear of frame 12. Particularly, in the preferred form, leg 160a is located between plates 46 and 48 and is pivotably mounted therebetween such as by a pivot shaft extending through collars welded to side plates 46 and 48, with the pivot axis of leg 160a being parallel to and spaced from the rotational axis of wheels 14. Wheels 16 are rotatably mounted on opposite ends of second leg 160b which defines the rotational axis of wheels 16 spaced from and parallel to leg 160a, with wheels 16 located on opposite sides of frame 12. Legs 160a and 160b are held in a spaced, parallel relation by a corrector 160c so that the axis of wheels 16 are parallel and spaced from the axis of wheels 14 and leg 160a.

In the preferred form, sod cutter 10 according to the preferred teachings of the present invention includes a drive shaft 166 rotatably mounted in frame 12 about an axis which is spaced from and parallel to the axes of shaft 32, wheels 14 and 16, and leg 160a. In the most preferred form, shafts 32 and 166 are mounted by flange type bearings 34 and 167 in openings formed in side plates 46 and 48. It can be appreciated that flange type bearings 34 and 167 are less expensive than pillow block bearings which are required if shafts 32 and 166 were mounted to a single longitudinally extending frame member rather than spaced plates 46 and 48 as in the preferred form of the present invention.

Shaft 166 has a lateral extent generally equal to the lateral extent of and for engaging the outer peripheries of wheels 16. First and second tubular members 168 are removably and slideably received on the opposite ends of shaft 166 parallel to the axis of shaft 166 and removably retained thereon in a nonrotatable manner relative to shaft 166 such as by use of a spring pin extending through tubular member 168 and shaft 166 at a nonparallel angle to the axis of shaft 166. Tubular member 168 has an outer periphery of a noncylindrical shape and in particular has cross sections which are noncircular perpendicular to the axis of shaft 166.

In the preferred form, tubular member 168 has an outer periphery having circular cross sections perpendicular to the axis of shaft 166 and in the most preferred form having an inner periphery having square cross sections perpendicular to the axis of shaft 166 of a diameter generally equal to the diameter of shaft 166 and for slideable receipt on shaft 166. In the most preferred form, tubular members 168 are formed by cutting and drilling square steel bar stock.

Suitable provisions are provided for rotating shaft 166. Specifically, in the preferred form, shaft 32 includes a sheave 170 located intermediate offset portions 33 and side 46, and shaft 166 includes a sheave 172 located intermediate first tubular member 168 and side 46. A belt 174 extends around sheaves 170 and 172 in a generally tensioned manner by any suitable manner such as by moving an idler pulley 176 against belt 174. In the preferred form, sod cutter 10 includes an idler arm 178 mounted to side plate 46 about a pivot axis parallel to but spaced from shafts 32 and 166, with pulley 176 being pivotably mounted to the opposite end of arm 178 about an axis parallel to and spaced from the pivot axis of arm 178 and the axes of shafts 32 and 166.

Frame 12 in the most preferred form includes a handlebar mounting tube 180. Specifically, in the most preferred form, tube 180 has inner and outer peripheries each having noncircular and particularly square cross sections. In the most preferred form, plate 46b intermediate its side edges and at its back edge includes an opening 181 of a size and shape for slideable receipt of tube 180 adjacent to plate 46c. First and second tabs 182 are cut from and bent inwardly generally perpendicularly from plate 46c at a spacing for abutting on opposite sides of and for slideable receipt of tube 180 received in opening 181. It can be appreciated that opening 181 and tabs 182 allow for ease of positioning of tube 180 which in the preferred form is secured by welding.

In the most preferred form, a storage position tube 184 is suitably secured to handle mounting tube 180 adjacent to its upper end such as by welding. Tube 184 is at an acute angle in the order of 45° relative to tube 180, with the upper end of tube 184 located in front of the lower end. Tube 184 includes a through bore 186 for slideable receipt of a lynch pin 188 which in the preferred form is tethered.

In the most preferred form, a C-shaped member 190 has its free ends welded to the back side of tube 180 and with its center portion defining a lock plate held relative to the outer periphery of tube 180. A gap is defined between the outer periphery of tube 180 and the lock plate of C-shaped member 190. A handlebar lock 192 extends through an aperture or opening in member 190 through a nut 194 welded to tube 180 or member 190 and through an aperture or opening formed in tube 180 between the inner and outer peripheries. Thus, lock 192 is threadably received in one of tube 180 and the lock plate of member 190. The gap exists between nut 194 and member 190 or nut 194 and tube 180 where nut 194 is positioned between tube 180 and member 190 in the preferred form. However, the gap could be formed between tube 180 and number 190 (which could have other shapes) if member 190 is located intermediate nut 194 and tube 180. A spring pin 196 or the like extends radially from lock 192 and is located in the gap defined by member 190. It can be appreciated that pin 196 allows rotation of lock 192 but prevents removal of lock 192 from tube 180 as pin 196 will abut with the end of the gap before lock 192 is threadably out of and removed from nut 194.

Sod cutter 10 includes suitable provisions for adjusting the depth that knife blade 44 extends below the tangential plane of the turf extending between wheels 14 and 16 or in other words the depth of the sod cut by knife blade 44. Specifically, a depth adjuster lever 198 is pivotably mounted relative to handle mounting tube 180 and frame 12 between its upper and lower ends about a lever axis parallel to and spaced from the axes of shafts 32 and 166, wheels 14 and 16 and leg 160a. Lever 198 is operatively connected to assembly 160 in the preferred form by a depth adjuster bar 200 pivotably mounted to leg 160b of assembly 160 and to the lower end of lever 198. Thus, by pivoting lever 198, assembly 160 and wheels 16 are pivoted about the pivot axis of leg 160a relative to frame 12 and wheels 14 mounted thereto.

In the most preferred form, assembly 160 and wheels 16 are lockable in a cutting or working position and a transport position. Specifically, in the most preferred form, a generally U-shaped trigger slide bracket 202 is mounted by its center to lever 198. A first leg of an L-shaped trigger 204 is slideably mounted to lever 198 by being slideably received in apertures in the ears of bracket 202 for slideable movement perpendicular to the axis of lever 198 between an engaged position and a disengaged position. Trigger 204 is biased in the downward, engaged position such as by a spring 206 positioned around the first leg of trigger 204 sandwiched between the upper ear of bracket 202 and a pin extending through the first leg of trigger 204. For ease of manual actuation, lever 198 includes a handle extending parallel to but spaced from the second leg of L-shaped trigger 204 so that the handle and second leg can be grasped in the operator's hand and squeezed together to thereby move trigger 204 against the bias of spring 206.

The lower end of the first leg of trigger 204 can be received in notches fixed relative to frame 12 and particularly in a depth adjuster brace 208 having an arched upper surface concentric to the axis of lever 198. When trigger 204 is in a first notch of brace 208, assembly 160 and wheels 16 are held in the transport position with knife blade 44 located above a tangential plane between wheels 14 and 16. When trigger 204 is in one of two second notches of brace 208 of the most preferred form, assembly 160 and wheels 16 are held in the working position with knife blade 44 located below a tangential plane between wheels 14 and 16 at a fixed depth corresponding to the particular depth associated with the notch in which trigger 204 is received. In the preferred form, notches are formed in brace 208 corresponding to different cutting depths. Thus, in the working position, knife blade 44 will be located below the turf upper surface and cuts a strip of sod as sod cutter 10 is propelled forward.

It should be appreciated that in the transport position, the outer peripheries of wheels 16 are radially spaced from tubular members 168 and shaft 166. Thus, wheels 14 and 16 are free wheeling and sod cutter 10 can be pushed by the operator to the desired work area as knife blade 44 also does not engage the turf. However, in the working position, wheels 16 engage shaft 166 and tubular members 168 which act as friction enhancers between wheels 16 and shaft 166. Due to the noncylindrical shape of tubular members 168, rotation of shaft 166 and tubular members 168 causes wheels 16 to rotate or be driven due to a friction drive between the outer peripheries of pneumatic wheels 16 and tubular members 168. In this regard, this friction drive does not utilize a gearing or similar interlocking relation between tubular members 168 and wheels 16 which would require wheels 16 having a particular configuration and which would be subject to clogging when engaging the turf. As wheels 16 engage the turf, rotation of wheels 16 by rotation of tubular members 168 causes sod cutter 10 to be propelled forward. As shaft 166 is rotated by being rotatably connected to shaft 32, knife blade 44 is simultaneously oscillating while sod cutter 10 is being propelled forward to thereby cut a strip of sod.

Although friction drive of the type of the present invention has been utilized in prior sod cutters, it is believed that the friction drive of sod cutter 10 of the preferred form obtains synergistic results. Specifically, prior friction drives in sod cutters provided a bead of welding directly upon shaft 166. However, if it was ever necessary to service shaft 166 or components associated therewith, it was necessary to grind off the welded bead. Additionally, when the welded bead wore off, it may be possible to add another welded bead, with at least some operators not having access to a welder, but often required replacement of shaft 166 especially after repeated replacement of the welded beads. According to the preferred teachings of the present invention, tubular member 168 is the wear element, is formed by simply cutting and drilling standard size square stock, and can be readily removed and installed for either replacement or servicing purposes.

Additionally, prior friction drives utilized screw type adjustment of wheels 16 relative to frame 12. The problem is that an operator could adjust wheels 16 relative to shaft 166 with too little or too much pressure. Too little pressure could result in excessive slippage between wheels 16 and shaft 166. Too much pressure could result in excessive wear of wheels 16, shaft 166, bearings 167, and the like. Sod cutter 10 according to the preferred teachings of the present invention allows assembly 160 to always be positioned relative to shaft 166 such that the pressure of tubular members 168 upon wheels 16 is present within desired levels. Additionally, a common operation is to cut a series of strips of sod with the sod cutter being moved from its working position to its transport position multiple times. Sod cutter 10 of the preferred form can rapidly move between its working and transport positions simply by pivoting lever 198 in comparison to the time necessary to turn a screw type adjustment. Further, the depth of knife blade 44 of the associated second notch engaged by trigger 204 will be the same every time, sod cutter 10 according to the teachings of the present invention is moved to its working position for consistency, which could be variable for screw type adjustment as the depth is dependent upon the number of times the screw is rotated which is often very difficult to be consistent every time.

Further, the square shape of the outer peripheries of tubular members 168 according to the preferred teachings of the present invention provides a variation in the contact pressure applied between tubular members 168 and the pneumatic tires of wheels 16. This variation in contact pressure causes a change in the roundness of the outside diameter of the tires such that debris, such as mud and grass clippings, will be more easily dislodged from the tire and fall to the ground. Additionally, the square shape of the outer periphery of tubular members 168 automatically furnish sharp corners which provide the variation in the penetration depth of tubular member 168 into the outside diameter of the pneumatic drive tire. The depth variation will provide a constant change in the amount of friction created between tubular members 168 and the tires making it nearly impossible to cause slipping and the loss of power to drive wheels 16. Other shapes for prior friction drives and particularly the circular types utilizing welding beads, will slip easily and often when moisture, mud or grass clippings are encountered during use.

Sod cutter 10 according to the preferred teachings of the present invention includes a U-shaped handlebar 210 having legs extending at an obtuse angle outwardly from the opposite ends of a center portion. A U-shaped control 212 has a shape and size generally corresponding to handlebar 210. Control 212 is pivotably mounted relative to handlebar 210 about the center portion of control 212 defining the pivot axis extending parallel to but spaced in front of and above the center portion of handlebar 210. Control 212 is pivotal between an unactuated position with the leg portions extending at an acute angle upward relative to the legs of handlebar 210 and a fully actuated position with the leg portions engaging the the legs of handlebar 210. A jacketed cable 213 is connected to the throttle for engine 18 of sod cutter 10. A spring 215 is connected to the throttle of engine 18 for biasing control 212 from the actuated position towards the unactuated position. Other engine controls including but not limited to an on/off switch, a fuel shutoff switch, and a choke can be located on handlebar 210 such as mounted to a control box connected to handlebar 210 and/or components connected to handlebar 210.

A mast 214 is secured to handlebar 210 and in the most preferred form is removably secured to tube 180 or 184. In the most preferred form, mast 214 includes a first linear portion 214a extending from center portion of handlebar 210 at an obtuse angle in the order of 135° relative to the legs of handlebar 210. Mast 214 includes a second linear portion 214b extending at an obtuse angle in the order of 140° relative to linear portion 214a and having an outer periphery of a size for slideable receipt in the inner periphery of tube 180. The lower end of linear portion 214b includes a through bore 214c which in the most preferred form is threaded at least adjacent the rear side thereof.

In the most preferred form, handlebar 210 can be positioned relative to frame 12 in operating and storage positions. In the operating position, linear portion 214b is inserted into and slideably received in tube 180 until the aperture formed in tube 180 and handle lock 192 are aligned with bore 214c. At that time, handle lock 192 can be rotated in nut 194 and inserted into and most preferably threaded into through bore 214c. Alternatively, the end of handle lock 92 can sandwich linear portion 214b against the opposite side of tube 180, with bore 214c providing a positioning as well as slide removal prevention function in this arrangement. It should be appreciated that in the operating position, the legs of handlebar 210 extend generally horizontally rearward and the center portion extends generally horizontally at generally the rearward extent of wheels 16. It can be appreciated that the threadable or sandwich type connection between tube 180 and linear portion 214b provided by lock 192 virtually eliminates relative movement of handlebar 210 relative to tube 180 and frame 12 and reduces the transmission of vibration to handlebar 210 and thus the operator.

The shape and arrangement of control 212 according to the preferred teachings of the present invention relative to handlebar 210 are advantageous as the operator's hand(s) tend to rest upon and press down on handlebar 210 and thus control 212 in normal operation of sod cutter 10. In the most preferred form of the present invention, when control 212 is moved to the actuated position, the throttle to engine 18 is opened to increase the rotational speed of the output shaft and centrifugal clutch 24 which then rotates shafts 32 and 166 resulting in oscillation of knife blade 44 and propelling of sod cutter 10 Particularly, it is desirable to apply downward pressure on handlebar 210 during operation of sod cutter 10 to increase traction of wheels 16 and assist in forward movement of sod cutter 10. Thus, control 212 would be sandwiched against handlebar 210 when downward pressure is placed upon handlebar 210. To stop operation, control 212 is simply released. Thus, operation of sod cutter 10 according to the teachings of the present invention is simple.

The location and position of wheels 16 of sod cutter 10 according to the preferred teachings of the present invention are such that wheels 16 provide a means to hold the cut sod down on the soil thus preventing it from rising and then bunching up and causing sod cutter 10 to jam. Wheels 16 are placed close together and positioned to be directly over the cut sod and close enough to knife blade 44 to control the rising action of the cut sod. This feature allows the operator of sod cutter 10 to continue the cutting task uninterrupted without having to stop and clear sod jams before resuming operation. This feature plus the geometry of position of the other cutting elements allow sod cutter 10 according to the preferred teachings of the present invention to cut sod in very wet conditions.

When it is desired to store sod cutter 10 including but not limited to in the trunk or storage space of a vehicle, handle lock 192 is rotated in the unthread direction relative to nut 194 to pass through hole 214c until handle lock 192 is in a noninterfering relation to linear portion 214b to allow sliding of linear portion 214b relative to tube 180. It should be appreciated that according to the preferred teachings of the present invention, lock 192 can not be threaded completely out of nut 194 or be separated from sod cutter 10. In particular, spring pin 196 will abut with the end of the gap to prevent further movement therebeyond. This is an especially advantageous feature when sod cutter 10 is utilized in a rental environment where often separable components can be lost by the rental customer.

After lock 192 is in a noninterfering relation, linear portion 214b can be slid from tube 180. Once removed from tube 180, handlebar 210 can be turned forward such that the legs of handlebar 210 extend forward of linear portion 214b. In particular, the first leg on the right side of sod cutter 10 in the operating position is positioned on the left side of sod cutter 10 in the storage position, and the second leg on the left side of sod cutter 10 in the operating position is positioned on the right side of sod cutter 10 in the storage position. Linear portion 214b can be slid into tube 184 until bores 186 and 214c are aligned at which time pin 188 can be inserted therethrough to thereby lock linear portion 214b relative to tube 184. Due to the angle of tube 184 relative to tube 180, the angle between portions 214a and 214b, and the angle between portion 214a and handlebar 210, the center portion of handlebar 210 generally abuts with engine 18 and the legs of handlebar 210 extend downwardly therefrom on opposite sides of engine 18. In the storage position, mast 214 can be utilized to lift and haul sod cutter 10. It can be appreciated that in the storage position, sod cutter 10 has a lesser longitudinal length generally to the rear extent of wheels 16 rather than handlebar 210 when in the operating position and has a lesser height to the top of lever 198 rather than control 212 when in the operating position. The reduced size of sod cutter 10 according to the preferred teachings of the present invention is advantageous for reduced storage requirements but especially for shipping such as from the manufacturer to the customer and for moving between work sites and particularly in the rental environment where the rental customer may wish to transport in an automobile, van or SUV rather than in a pickup truck, or trailer as in commercial operations. Additionally, it can be appreciated that sod cutter 10 can be shipped in a relatively small shipping container while being completely assembled. Once removed from the shipping container, sod cutter 10 according to the teachings of the present invention can be placed into its working position ready for use in a short time and without requiring use of tools.

It should be appreciated that frame 12 according to the teachings of the present invention is very strong and durable and relatively inexpensive to fabricate. In particular, generally frames are of two types and specifically those that include pillow block bearings and those that include flange type bearings. For ease of fabrication, it is desired to have the openings for flange type bearings or for any other members which are desired to have somewhat accurately placed to be stamped in the sheet material. Bending the sheet material is not always consistent so forming frame 12 from a single part containing two bends and properly aligned paired holes in each of sides 46 and 48 is impossible. Thus, prior to the present invention, frames were made of multiple pieces connected together with fasteners to allow adjustment. However, the costs of the fasteners and of assembly significantly increased the cost as well as resulted in strength deficiencies. The present invention overcomes these deficiencies by utilizing jigs which align the openings of side plates 46 and 48 after plates 46a, 46b, and 46c are bent during the welding of the free edges of plates 46a, 46b, and 46c to plate 48. Similarly, tube 180 can be quickly welded in place. Thus, the use of fasteners is eliminated and the costs of components and assembly are significantly reduced while providing frame 12 of increased strength and lesser weight according to the preferred teachings of the present invention, with the total weight of sod cutter 10 of the preferred form being only 63.5 kilograms (140 pounds). The lesser weight of frame 12 and of sod cutter 10 according to the teachings of the present invention is a major factor in allowing ease of use of sod cutter 12 compared to prior sod cutters.

It should be appreciated that sod cutter 10 is relatively easy to operate for anyone from a novice homeowner to a professional landscaper. Specifically, sod cutter 10 includes relatively few moving parts and thus minimizes costs of fabrication and servicing. Additionally, none of the components are needed to be removed from sod cutter 10 for normal operation, with connection components being either tethered or nonremovable. This is especially advantageous for the rental environment. Because of its light weight and ease of operation, sod cutter 10 according to the teachings of the present invention can be used in many applications including those of traditional sod cutters as well as others such as for flower beds, sculpting lawns, patio installation and ball field trimming where traditional sod cutters were not used because of their size and complexity. Now that the basic teachings of the present invention have been explained, many extensions and variations will be obvious to one having ordinary skill in the art. For example, although sod cutter 10 of the most preferred form includes the combination of several, unique features believed to obtain synergistic results, earthworking machines could be constructed according to the teachings of the present invention including such features singly or in other combinations. As an example, the unique friction drive of the present invention could be utilized in other types of frames including but not limited to conventional frames.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. For a friction drive in an earthworking machine including a shaft rotatable about an axis and engaging an outer periphery of a wheel, with the outer periphery of the wheel engaging the earth and propelling the earthworking machine on the earth, a friction enhancer comprising a tubular member adapted to be removably and slideably received on the shaft parallel to the axis, with the tubular member including an outer periphery having noncircular cross sections perpendicular to the axis, with the tubular member adapted to be prevented from rotating relative to the shaft.

2. The friction enhancer of claim 1 with the wheel being a pneumatic wheel.

3. The friction enhancer of claim 2 with the outer periphery having square cross sections perpendicular to the axis.

4. The friction enhancer of claim 3 with the tubular member having an inner periphery having circular cross sections perpendicular to the axis, with the tubular member being in the form of square stock which is cut and drilled.

5. The friction enhancer of claim 4 further comprising a spring pin extending through the tubular member and the shaft at a nonparallel angle to the axis.

6. The friction enhancer of claim 3 with the wheel being pivotably mounted to a frame parallel to and spaced from the axis of the shaft and a rotational axis of the wheel.

7. Earthworking machine comprising, in combination: a movably supported frame; a drive shaft rotatably mounted to the frame about a shaft axis and adapted to be rotated; an axle assembly pivotably mounted to the frame about an axle axis parallel to the shaft axis; at least one wheel rotatably mounted to the axle assembly about a wheel axis spaced from and parallel to the shaft axis and the axle axis, with the axle assembly being pivotable between a transport position and a working position, with the wheel having an outer periphery spaced from the drive shaft in the transport position and engaging the drive shaft in the working position, with the wheel being driven by the drive shaft when rotated.

8. The earthworking machine of claim 7 further comprising, in combination: a friction enhancer removably received in a nonrotatable manner on the shaft, with the shaft with the friction enhancer received thereon including an outer peppery having noncircular cross sections perpendicular to the shaft axis.

9. The earthworking machine of claim 8 with the friction enhancer comprising a tubular member slideably received on the shaft.

10. The earthworking machine of claim 9 with the tubular member including the outer periphery having square cross sections perpendicular to the shaft axis.

11. The earthworking machine of claim 7 further comprising, in combination: an adjuster lever pivotably mounted relative to the frame about a lever axis parallel to the shaft axis, the axle axis, and the wheel axis, with the lever having an end operatively connected to the axle assembly.

12. The earthworking machine of claim 11 further comprising, in combination: a trigger slideably mounted to the lever for movement between an engaged position and a disengaged position, with the trigger being biased to the engaged position; a first notch fixed relative to the frame for receiving the trigger in the engaged position when the lever is in the transport position and a second notch fixed relative to the frame for receiving the trigger in the engaged position when the lever is in the working position.

13. The earthworking machine of claim 12 with the lever being operatively connected to the axle assembly by a bar pivotably connected to the end of the lever and pivotably connected to the axle assembly.

14. Frame for an earthworking machine comprising, in combination: first and second planar side plates, with each side plate having an upper edge and a back edge; a frame plate bent generally perpendicular to the upper edge of one of the side plates, with the frame plate having a free edge welded to the upper edge of the other of the side plates; and an end plate bent generally perpendicular to the back edge of one of the side plates, with the end plate having a free edge welded to the back edge of the other of the side plate, with the plates being interconnected together in a three dimensional configuration without fasteners and with the first and second side plates, the frame plate, and the end plate being formed from two planar elements.

15. The frame of claim 14 with the frame plate and the end plate bent relative to the first side plate and the free edges being welded to the second side plate.

16. The frame of claim 15 with the frame plate having a rear edge and with the end plate having a top edge, with the rear edge being welded to the top edge.

17. The frame of claim 16 further comprising, in combination: a handle tube; an opening at the rear edge for slideably receiving the handle tube; and first and second tabs cut from and bent relative to the end plate and spaced for abutting opposite sides of the handle tube received in the opening.

18. The frame of claim 16 further including a mount plate bent generally perpendicular to the upper edge of the first side plate, with the mount plate including a free edge welded to the upper edge of the second plate, with the mount plate being spaced from the frame plate perpendicular to the mount and frame plates and spaced from the frame plate perpendicular to the end plate.

19. Connection comprising, in combination: a first tube having an inner periphery and an outer periphery; a first aperture formed in the first tube between the inner and outer peripheries, a second tube having an outer periphery of a size for slideable receipt in the inner periphery of the first tube; a bore formed in the second tube aligned with the first aperture in the first tube when the second tube is slideably received in the first tube; a lock plate held relative to the outer periphery of the first tube to define a gap therebetween; a second aperture formed in the lock plate; a threaded lock extending through the first and second openings, with the threaded lock being threadably received in one of the first tube and the lock plate; and a pin located in the gap and extending radially from the lock, with the pin preventing the lock from being threaded out of the said one of the first tube and the lock plate, with the lock being insertable into the bore to prevent sliding of the second tube relative to the first tube and being removable from the bore to allow sliding of the second tube relative to the first tube.

20. The connection of claim 19 with the bore being threaded to threadably receive the lock.

21. Control assembly for an earthworking machine comprising, in combination: a U-shaped handlebar including first and second legs extending from opposite sides of a center, with the first and second legs and the center extending generally horizontally above the earth and with the first and second legs extending behind the center; and a U-shaped control including first and second leg portions extending from opposite sides of a center portion, with the U-shaped control having a shape and size corresponding to the U-shaped handlebar, with the center portion being pivotably mounted relative to the U-shaped handlebar about an axis spaced in front of and above the center of the U-shaped handlebar, with the U-shaped control being pivotal between an unactuated position with the leg portions extending at acute angle upward relative to the legs of the U-shape handlebar and an actuated position with the leg portions engaging the legs of the U-shaped handlebar.

22. The control assembly of claim 21 further comprising, in combination: a jacketed cable adapted to be connected to a throttle for an engine of the earthworking machine; and a spring adapted to be connected to the throttle for biasing the U-shaped control from the actuated position towards the unactuated position.

23. Assembly for an earthworking machine comprising, in combination: a handlebar having a mast secured thereto; a handlebar mount, with the mast of the handlebar being removably and slideably connected to the handlebar mount, with the handlebar being positionable in a working position and in a storage position by slideably removing the mast while secured to the handlebar from the handlebar mount, then changing an orientation of the handlebar with the mast secured thereto relative to the handlebar mount, and then slideably connecting the mast while secured to the handlebar with the handlebar mount, with the handlebar in the working position being positioned for gripping by an operator while operating the earthworking machine, and with the mast in the storage position being positioned over the earthworking machine for lifting and hauling.

24. Assembly for an earthworking machine comprising, in combination: a handlebar having a mast; a handlebar mount, with the mast of the handlebar being removably connected to the handlebar mount in a working position and in a storage position, with the handlebar in the working position being positioned for gripping by an operator while operating the earthworking machine, and with the mast in the storage position being positioned over the earthworking machine for lifting and hauling, with the handlebar being generally U-shaped and including first and second legs extending from opposite sides of a center, with the mast extending from the center, with the first and second legs extending generally horizontally rearward and the center extending generally horizontally in the working position, with the first and second legs extending forward and on opposite sides of the earthworking machine in the storage position.

25. The assembly of claim 24 with the mast including a first linear portion having a lower end and an upper end, with the center being spaced from the upper end and extending generally perpendicular to the first linear portion, with the first linear portion being removably connected to the handlebar mount by being slideably connected generally vertically to the handlebar mount in the working position, with the first linear portion being removably connected to the handlebar mount by being slideably connected at an acute angle to vertical to the handlebar mount in the storage position.

26. The assembly of claim 25 with the mast including a second linear portion extending from the center of the handlebar at an obtuse angle relative to the first and second legs of the handlebar and extending from the first linear portion at an obtuse angle.

27. The assembly of claim 26 with the handlebar mount being a first tube having an inner periphery and an outer periphery; a first aperture formed in the first tube between the inner and outer peripheries, with the first linear portion having an outer periphery of a size for slideable receipt in the inner periphery of the first tube; a bore formed in the first linear portion aligned with the opening in the first tube when the first linear tube is slideably received in the first tube; a lock plate held relative to the outer periphery of the first tube to define a gap therebetween; a second aperture formed in the lock plate; a threaded lock extending through the first and second openings, with the threaded lock being threadably received in one of the first tube and the lock plate; and a pin located in the gap and extending radially from the lock, with the pin preventing the lock from being threaded out of the said one of the first tube and the lock plate, with the lock being insertable into the bore to prevent sliding of the first linear portion relative to the first tube and being removable from the bore to allow sliding of the first linear portion relative to the first tube.

28. Assembly for an earthworking machine comprising, in combination: a handlebar being generally U-shaped and including first and second legs extending from opposite sides of a center; a mast extending from the center and including a first linear portion having a lower end and an upper end, with the center being spaced from the upper end and extending generally perpendicular to the first linear portion; and a handlebar mount, with the first linear portion being slideably connected generally vertically to the handlebar mount with the first and second legs extending generally horizontally rearward and the center extending generally horizontally in a working position, with the first linear portion being slideably connected at an acute angle to vertical to the handlebar mount with the first and second legs extending forward and on opposite sides of the earthworking machine in a storage position.

29. Earthworking machine comprising, in combination: a movably supported frame comprising first and second planar side plates, with each side plate having an upper edge and a back edge, a frame plate bent generally perpendicular to the upper edge of one of the side plates, with the frame place having a free edge welded to the upper edge of the other of the side plates, and an end plate bent generally perpendicular to the back edge of one of the side plates, with the end plate having a free edge welded to the back edge of the other of the side plate, with the plates being interconnected together in a three dimensional configuration without fasteners and with the first and second side plates, the frame plate, and the end plate being formed from two planar elements; a U-shaped handlebar including first and second legs extending from opposite sides of a center; a mast extending from the center and including a first linear portion having a lower end and an upper end, with the center being spaced from the upper end and extending generally perpendicular to the first linear portion, with the movably supported frame including a handlebar mount, with the mast of the U-shaped handlebar being removably connected to the handlebar mount in a working position and in a storage position, with the U-shaped handlebar in the working position being positioned for gripping by an operator while operating the earthworking machine, and with the mast in the storage position being positioned over the earthworking machine for lifting and hauling, with the first and second legs and the center extending generally horizontally above the earth and with the first and second legs extending behind the center in the working position; a U-shaped control including first and second leg portions extending from opposite sides of a center portion, with the U-shaped control having a shape and size corresponding to the U-shaped handlebar, with the center portion being pivotably mounted relative to the U-shaped handlebar about a control axis spaced in front of and above the center of the U-shaped handlebar, with the U-shaped control being pivotal between an unactuated position with the leg portions extending at an acute angle upward relative to the legs of the U-shaped handlebar and an actuated position with the leg portions engaging the legs of the U-shaped handlebar, with the first linear portion being slideably connected generally vertically to the handlebar mount with the first and second legs extending generally horizontally rearward and the center extending generally horizontally in the working position, with the first linear portion being slideably connected at an acute angle to vertical to the handlebar mount with the first and second legs extending forward and on opposite sides of the earthworking machine in the storage position, with the mast having an inner periphery and an outer periphery; a first aperture formed in the mast between the inner and outer peripheries, with the first linear portion having an outer periphery of a size for slideable receipt in the inner periphery of the mast; a bore formed in the first linear portion aligned with the first aperture in the mast when the first linear portion is slideably received in the mast; a lock plate held relative to the outer periphery of the mast to define a gap therebetween; a second aperture formed in the lock plate; a threaded lock extending through the first and second openings, with the threaded lock being threadably received in one of the mast and the lock plate; a pin located in the gap and extending radially from the threaded lock, with the pin preventing the threaded lock from being threaded out of the said one of the mast and the lock plate, with the threaded lock being insertable into the bore to prevent sliding of the first linear portion relative to the mast and being removable from the bore to allow sliding of the first linear portion relative to the mast; a drive shaft rotatably mounted to the movably supported frame about a shaft axis and adapted to be rotated; a friction enhancer comprising a tubular member adapted to be removably and slideably received on the drive shaft parallel to the shaft axis, with the tubular member including an outer periphery having noncircular cross sections perpendicular to the shaft axis, with the tubular member adapted to be prevented from rotating relative to the drive shaft; an axle assembly pivotably mounted to the frame about an axle axis parallel to the shaft axis; at least one wheel rotatably mounted to the axle assembly about a wheel axis spaced from and parallel to the shaft axis and axle axis, with the axle assembly being pivotable between a transport position and a working position, with the wheel having an outer periphery spaced from the drive shaft in the transport position and engaging the friction enhancer received on the drive shaft in the working position, with the wheel being driven by the drive shaft when rotated.

* * * * *

UNITED STATES PATENT AND TRADEMARK OFFICE
CERTIFICATE OF CORRECTION

PATENT NO. : 6,962,209 B2
APPLICATION NO. : 09/982126
DATED : November 8, 2005
INVENTOR(S) : Thomas E. Isaman, Terrence R. Bondeson and Andrew Hawkins

It is certified that error appears in the above-identified patent and that said Letters Patent is hereby corrected as shown below:

Column 11, line 43, delete "peppery" and insert --periphery--.

Column 13, lines 12-26, delete claim 23.

Signed and Sealed this

Fifteenth Day of January, 2008

JON W. DUDAS
*Director of the United States Patent and Trademark Office*